United States Patent
Bastioli et al.

(10) Patent No.: US 6,727,342 B1
(45) Date of Patent: Apr. 27, 2004

(54) USE OF POLYESTER RESINS FOR THE PRODUCTION OF ARTICLES HAVING GOOD PROPERTIES AS BARRIERS TO WATER VAPOR

(75) Inventors: Catia Bastioli, Novara (IT); Marco Foa', Novara (IT); Giandomenico Cella, Novara (IT); Giovanni Floridi, Perugia (IT); Fernanda Farachi, San Pietro Vernotico (IT); Tiziana Milizia, Avellino (IT)

(73) Assignee: Ministero Dell'Universita'E Della Ricerca Scientifica Technologica, Rome (IT)

( * ) Notice: Subject to any disclaimer, the term of this patent is extended or adjusted under 35 U.S.C. 154(b) by 0 days.

(21) Appl. No.: 09/786,097

(22) PCT Filed: Aug. 27, 1999

(86) PCT No.: PCT/EP99/06333

§ 371 (c)(1),
(2), (4) Date: Jun. 8, 2001

(87) PCT Pub. No.: WO00/12627

PCT Pub. Date: Mar. 9, 2000

(30) Foreign Application Priority Data

Aug. 28, 1998 (IT) ......................... TO98A0729
Oct. 26, 1998 (IT) ......................... TO98A0907

(51) Int. Cl.⁷ ............................................. C08G 63/02
(52) U.S. Cl. ................. 528/272; 528/190; 528/288; 528/354; 528/359; 525/413; 525/54.3; 428/411.1; 428/480; 428/35.1
(58) Field of Search ................. 528/190, 272, 528/288, 354, 359; 428/411.1, 480, 35.1; 525/413, 54.3; 524/9

(56) References Cited

U.S. PATENT DOCUMENTS 5,129,180 A * 7/1992 Stewart .................... 47/57.6
5,412,005 A    5/1995 Bastioli et al.
5,440,008 A    8/1995 Ichikawa et al.
5,444,143 A    8/1995 Ohta et al.
5,599,858 A    2/1997 Buchanan et al.
5,939,183 A * 8/1999 Kuratsuji et al. ............ 428/324

FOREIGN PATENT DOCUMENTS

EP   0 572 256 A2   12/1993
WO   WO 97/43329    11/1997

* cited by examiner

*Primary Examiner*—Rabon Sergent
*Assistant Examiner*—U. K. Rajguru
(74) *Attorney, Agent, or Firm*—Bryan Cave LLP

(57) ABSTRACT

Polyester resins formed by recurring units $X=[O-(CH_2)_n-OCO-(CH_2)_m-CO]$ and/or $Y=[O-(CH_2)_k-CO]$, where the half-sum of n+m is equal to or greater than 6 and k is a number equal to or greater than 6, or by copolymers comprising units and/or sequences having the formula $x_i[O-(CH_2)_{ni}-OCO-(CH_2)_{mi}-CO]$; $y_j[O-(CH_2)_{kj}-CO]$ where: i,j=1–5; $n_i$=2–22; $m_i$=0–20; $k_j$=1–21; (Formula (1)) and $x_i$ and $y_j$ vary between 0 and 1 and are molar fractions of the various units such that (Formula (2)), are used for the preparation of products in which a permeability to water vapour of less than 350 g×30 $\mu$m/m² per day, measured at 38° C. and 90% RH and good biodegradability are required.

$$\sum_{i=1}^{5} x_i + \sum_{j=1}^{5} y_j = 1 \quad (1)$$

$$\sum_{i=1}^{5} x_i \cdot \left(\frac{n_i + m_i}{2}\right) + \sum_{j=1}^{5} y_j \cdot k_j \geq 6 \quad (2)$$

13 Claims, No Drawings

USE OF POLYESTER RESINS FOR THE PRODUCTION OF ARTICLES HAVING GOOD PROPERTIES AS BARRIERS TO WATER VAPOR

The present invention relates to the use of biodegradable polyester resins in the production of formed articles having good properties as barriers to water vapour.

The water-vapour barrier properties of biodegradable polymers developed in recent years are quite poor.

For example, polyesters such as polyhydroxybutyrate-valerate, polylactic acid, polyglycolic acid, polycaprolactone, polybutylene succinate, copolymers such as polybutylene adipate-co-terephthalate, polyester-amides such as polybutylene adipate-co-caprolactam, polyvinyl alcohol, ethylene-vinyl alcohol copolymers, polyesters-urethanes, and esters of cellulose and regenerated cellulose have permeabilities to water vapour greater than 300 g×30 $\mu$m/m$^2$ per day at 38° C. and 90% relative humidity (RH) (Lyssy method).

The poor barrier properties can be related to the fact that these polymers have good biodegradability which, in order for the bacterial action to be performed advantageously, means that the polymer should be wettable and hence contains polar groups in its structure with a consequent reduction in its water-vapour barrier properties since the polar groups increase the solubility of water in the polymer and hence its permeability to water vapour.

High permeability to water vapour considerably limits the fields of use of biodegradable polymers such as the above-mentioned aliphatic polyesters or copolyesters, particularly where good biodegradability and low permeability to water would be very desirable.

Fields of use in which there is a particular need for biodegradable materials having good water-vapour barrier properties are, for example, the hygiene field (so-called non-breathable nappies, that is to say, nappies with a low transpiration value, similar to the nappies which are in use with a backsheet of polyethylene and non-woven polypropylene fabric), multi-layer and non-multi-layer food packaging based on laminated milk cartons, mulching of soils where the evaporation of water through materials is to be as limited as possible, containers for soil for growing plants in greenhouses, sacks for collecting grass cuttings which require reduced biodegradation rates by virtue of a lower wettability of the biodegradable film of which the sack is made, non-woven, fabric which can provide a dry feel for nappies, fishing nets which must not undergo significant alterations due to water during the period of use, expanded products for packaging which requires moisture protection whilst remaining biodegradable, irrigation pipes for agriculture, products in contact with liquid foodstuffs, such as fast-food cups, plates and drinking straws, expanded trays for foodstuffs, blister packs for pharmaceutical products, nursery plant-pots through which moisture must not be able to pass and which must have a degradation process which does not interfere with the growth of the plants, hygiene products such as colostomy bags and the like, or blood containers, fibres for disposable products which can withstand water and a few washings, for disposable hosiery and garments, etc.

It has now been found, unexpectedly—in view of the outstanding permeability of aliphatic polyesters such as polybutylene adipate, polybutylene succinate, polyhexamethylene adipate and polybutylene adipate-co-terephthalate to water vapour—that the polyester resins defined below have good water-vapour barrier properties and, at the same time, are sufficiently biodegradable in normal composting conditions and are therefore usable in applications in which such properties are required.

The polyester resins usable in the applications of the invention are formed by recurring units X=[O—(CH$_2$)$_n$—OCO—(CH$_2$)$_m$—CO] and/or Y=[O—(CH$_2$)$_k$—CO], where the half-sum of n+m is equal to or greater than 6 and k is a number equal to or greater than 6, or by copolymers comprising units and/or sequences having the formula $x_i$[O—(CH$_2$)$_{ni}$—OCO—(CH$_2$)$_{mi}$CO]; $y_j$[O—(CH$_2$)$_k$—CO] where:

$i,j=1-5$; $n_i=2-22$; $m_i=0-20$; $k_j=1-21$;

$$\sum_{i=1}^{5} x_i + \sum_{j=1}^{5} y_j + 1$$

and $x_i$ and $y_j$ vary between 0 and 1 and are molar fractions of the various units such that $$\sum_{i=1}^{5} x_i \cdot \left(\frac{n_i + m_i}{2}\right) + \sum_{j=1}^{5} y_j \cdot k_j \geq 6,$$

or by recurring units

Z=[O—(CH$_2$)$_a$—OCO—(CH$_2$)$_b$—CO] where a=2–3 and b=7–11, present in sufficient quantity to ensure good barrier properties and biodegradability of the resins in the production of products in which a permeability to water vapour of less than 350 g×30 $\mu$m/m$^2$ per day at 38° C. and 90% RH and biodegradability in composting or burial conditions are required.

The products which can be produced from the polyesters as defined above can ensure permeability to water vapour of less than 350, more particularly less than 300, g×30 $\mu$m/m$^2$ per day at 38° C. and 90% RH.

The biodegradability of the products during composting or burial is sufficient to bring about their decomposition within the required periods of time.

More particularly, in the case of the products produced from the preferred polyester resins, the biodegradability is less than 30% in one month and more than 60% in six months, in accordance with DIN 54900, part II, or decomposition on 30 $\mu$m film of less than 10% in 14 days and more than 90% in 6 months, in accordance with the method described in "Journal of Environmental Polymer Degradation", Vol. 4, No. 1, 1996, p. 55–63, or in accordance with the burial test described in "Biodegradable Plastics, Practices and Test Methods" ASTM Subsection D-20.96.1 of Environmental Degradable Plastics, Version 4.0 Dec. 6, 1990.

The polyester resins usable according to the invention have a mean numeral molecular weight greater than 10000 and a melting point (acceptable for industrial applications) of between 60 and 110° C.

Polyester resins with a mean numeral molecular weight of between 45000 and 70000 have been found particularly advantageous for use according to the invention.

There is not the slightest reference in the literature either to the barrier properties, particularly to water vapour, of the polyester resins falling within the general formula given above, or to their good biodegradability by decomposition.

The use of the above-mentioned polyester resins in applications which require a low permeability to water vapour (below the value indicated above) combined with a biodegradability during composting compatible with the standards in use is novel and constitutes the subject of the present invention.

Examples of applications in which the polyester resins according to the invention are particularly useful are:

coatings produced by extrusion-coating with good water-barrier properties, particularly for the packaging of fresh milk and diary products, of meat, and of foods with high water content, multi-layer laminates with layers of paper, plastics material or paper/plastics material, aluminium and metallized films in general, films as such, and multi-layer films with other polymer materials, sacks for organic refuse and for grass cuttings with periods of use Longer than 1 week, single-layer and multi-layer food packaging, particularly containers for milk, yoghurt, cheeses, meat and beverages, in which the layer in contact with the food or beverage is formed by the polyester, composites with gelatinized starch, destructured starch, native starch in the form of a filler, or complexed starch, mono-directional or bi-directional films, semi-expanded and expanded products produced by physical and/or chemical means, by extrusion, injection, or agglomeration of pre-expanded particles, from materials constituted by the polyester as such, from blends, or from filled materials, expanded sheet and expanded containers for foods, (fruit, vegetables, meat, cheeses) for drugs, and for fast-food, fibres, fabrics and non-woven fabrics in the hygiene, sanitary and clothing fields, outer non-woven fabric and/or film, front tapes for increasing the thickness of the backsheet in critical points, and adhesive strips, for the production of nappies, composites with mineral and vegetable fillers with various form ratios, extruded or thermoformed sheets and profiles in the field of food and fast-food packaging (drinking straws, cups, trays, etc.), bottles for the food, cosmetics and pharmaceutical fields, fishing nets, containers for fruit and vegetables, irrigation pipes in the agricultural field, products produced from blends with other biodegradable polymers (for example, polybutylene succinate, polycaprolactone, polyhydroxybutyrate-co-valerate, polyesters-amides, aliphatic-aromatic polyesters), for correcting the biodegradation rate, the processability, and/or the permeability to water of these latter polymers and the superficial properties such as migration phenomena of low molecular weight molecules, products produced from blends with non-biodegradable polymers.

Polyesters falling within the general formula given above can be produced by the polycondensation, in accordance with known methods, of a bicarboxylic aliphatic acid with 2–22 carbon atoms with a diol with 2–22 carbon atoms, selected in a manner such that the half-sum of the carbon atoms relating to the acid and to the diol, is equal to or, preferably greater than 6, more preferably equal to 7, or by polycondensation of hydroxy-acids with 7–22, preferably 8–22 carbon atoms, or by ring-opening of the corresponding lactones or lactides; or by polycondensation of ethylen glycol with azelaic and sebacic acid.

Aliphatic-aromatic copolyesters, aliphatic-polyamide copolyesters, aliphatic-ether copolyesters, aliphatic-urea copolyesters or linear or branched urethanes in which the fraction of the aliphatic polyesters of the copolymers have the structure given above, and also blends of these polyester resins with unmodified or modified polysaccharides, with water-vapour barrier properties of the type defined above, also fall within the scope of the invention.

Examples of bicarboxylic acids usable are succinic, adipic, pimelic, suberic, azelaic, sebacic, brassilic, undecandioic and dodecandioic acids, and dimeric acids; examples of hydroxy-acids which may be used are glycolic, hydroxybutyric, hydroxypropionic, hydroxycaproic, hydroxyvaleric, 7-hyroxyheptanoic, 8-hydroxyoctanoic, 9-hydroxynonoic, 10-hydroxydecanoic and 13-hydroxytridecancarboxylic acids.

Examples of diols which may be used are 1,2-ethandiol, 1,4-butandiol, 1,6-hexandiol, 1,7-heptandiol, 1,8-octandiol, 1,9-nonandiol, 1,10-decandiol, 1,12-dodecandiol, 1,4-cyclohexandimethylol and 1,4-cyclohexandiol.

Diacids and dialcohols which come from renewable sources and which can be produced from fatty acids such as oleic and ricinoleic acids are preferred.

When the diol has less than 7 carbon atoms, the acid has a number of carbon atoms such that the half-sum of the carbon atoms of the diol and of the acid is equal to or greater than 6, more preferably equal or higher than 7. The same criterion applies when the bicarboxylic acid has less than 7 carbon atoms.

The polycondensation is performed at temperatures of between 180° and 230° C. in the presence of known catalysts based on transition and rare-earth metals such as tin, titanium, antimony, zinc, etc.

In the case of copolymers formed by or containing units or sequences of units X and Y, the preparation is performed in accordance with known methods by polycondensation of the diacid and the diol in the presence of the preselected lactone or lactide.

The mean numeral molecular weight obtainable by polycondensation may go up to values of the order of 100000 but it is preferably kept between 45000 and 70000.

Mean numeral molecular weights of less than 10000 do not permit the production of products having mechanical properties of practical interest.

The molecular weight can be increased by post-condensation reactions, operating either in the fused state or in the solid state, in the presence of polyfunctional compounds having groups reactive with the terminal —OH groups of the polyester, such as aliphatic or aromatic diisocyanates.

For post-condensation reactions (upgrades) in the solid state, the reaction is carried out by placing the solid resin in granular form in contact with the polyfunctional compound at ambient temperature or at a temperature slightly below the melting point of the resin for a period of time sufficient to bring about the desired increase in molecular weight.

The polyfunctional compound is used in the molten state, or dispersed homogeneously on the solid resin. Preferably, however, it is mixed with the resin in the fused state, for example, in an extruder, with periods of less than 5 minutes spent in the extruder to prevent undesired cross-linking reactions.

The intrinsic viscosity (measured in chloroform at 25° C.) is increased even beyond 1 dl/g. Preferably, it is brought to values greater than 0.7 dl/g and most preferably between 0.8 and 2.5 dl/g. The viscosity of the resin in the fused state after upgrading is generally between 2000 and 30000 Pas measured at 180° C. and with a "shear rate" of 100 $sec^{-1}$.

Diisocyanates are the preferred polyfunctional compounds acting as chain extenders; they are used in sufficient quantity to react with the terminal —OH groups of the resin. The quantity is between 0.2 and 1 equivalent of —NCO isocyanic groups per —OH group of the resin.

The quantity, expressed by weight, is generally between 0.01 and 3% of the resin, preferably between 0.1 and 2%.

The preferred diisocyanates are hexamethylene diisocyanate, diphenylmethane diisocyanate and isophorone diisocyanate.

Examples of other polyfunctional compounds which may be used are epoxides such as epoxy ethane, and the dianhydrides of tetracarboxylic aromatic acids such as pyromellitic anhydride.

The dianhydrides and the epoxides are also generally used in quantities of between 0.01 and 2% by weight of the resin.

The following examples are provided by way of non-limiting illustration of the invention.

EXAMPLE 1

A polybutylene sebacate film having an intrinsic viscosity of 1.26 measured at 0.2 g/dl in chloroform at 25° C. (produced by polycondensation of sebacic acid with 1,4-butandiol) was used for the production of organic refuse sacks, bags for growing plants in greenhouses with metering of micro-nutrients, mulching films, bags for vegetables and tubers which do not sweat, or for other specific applications in which a low permeability to water vapour is required. The permeability to water vapour of this film was 250 g×30 $\mu$m/m$^2$ per day at 38° C. and 90% RH.

The film for the different applications has been produced using a Ghioldi machine for film-blowing of 40 mm of diameter and L/D=30, a temperature of 125 C. and 60 rpm. The head of 100 mm was cooled with air at 10 C.

The polymer was also found particularly suitable for the production of products which are to come into contact with liquid foods, such as thermoformed cups, drinking straws and plates for fast-food.

In case of thermoformed sheets the sheets have been produced with a mono screw extruder of 30 mm of diameter and L/D=30, using a flat head of 20 cm of width. The extrusion temperature was of 13 ° C., the thickness was of 700 microns. The sheet has been thermoformed at 80 C. in a round cup. In case of drinking straws a MAI machine was used of 60 mm of diameter and L/D=25. The productivity at 150 C. was comparable with the one of polyethylene.

EXAMPLE 2

A polyhexamethylene sebacate film having an intrinsic viscosity of 0.7 dl/g (produced by polycondensation of sebacic acid with 1,6-hexandiol and subsequent upgrading with 1,6-hexamethylene diisocyanate at 60° C. to give an intrinsic viscosity of 1.3 dl/g) was used for the production of organic refuse sacks, bags for growing plants in greenhouses with metering of micro-nutrients, mulching films, bags for vegetables and tubers which do not sweat, or for other specific applications in which a low permeability to water vapour is required as in example 1.

The permeability to water vapour of this film was 180 g×30 $\mu$m/m$^2$ per day at 38° C. and 90% RH.

EXAMPLE 3

Polyhexamethylene sebacate having an intrinsic viscosity of 1.3 dl/g was used for the production of single-layer and multi-layer films and sheets and for the production of containers for foods and drinks. An HAAKE RHEOCORD machine was used with a diameter of 19 mm and L/D=25. The flat head had a width of 10 cm. The molten film was calandered on cardboard in order to obtain an extrusion coated product for food containers.

COMPARISON EXAMPLE 1

Polyhexamethylene adipate was used for the production of films the permeability of which was 700 g×30 $\mu$m/m$^2$ per day at 38° C. and 90% RH.

EXAMPLE 4

The barrier properties of the following polymers were measured: poly ethylene sebacate poly nonandiol sebacate, poly decandiol sebacate, polyoctandiol azelate, polyoctandiol brassilate.

The barrier properties, expressed as permeability to vapour in g×30 $\mu$m/m$^2$ per day (measured with a Lissy L80-4000 vapour permeability tester at 38° C. and 90% RH) were 300, 109, 100, 168, and 98, respectively.

The biodegradation behaviour according to the method described in "Journal of Environmental Polymer Degradation" vol. 4, N1, 1996, p55–63 for all the polymers fell inside the range of less than 10% of biodegradation in 14 days and more than 90% in 6 months.

We claim:

1. A method of making a biodegradable article having a permeability to water vapor of less than 350 g×30 $\mu$m/m$^2$ per day at 38° C. and 90% RH comprising:

manufacturing articles from aliphatic polyester resin,
   wherein said aliphatic polyester resin further comprises
   a) recurring units X=[O—(CH$_2$)$_n$—OCO—(CH$_2$)$_m$—CO] and/or Y=[O—(CH$_2$)$_k$—CO], where the half-sum of n+m is equal to or greater than 6 and k is a number equal to or greater than 6, or by copolymers comprising units and/or sequences having the formula x$_i$[O—(CH$_2$)$_{ni}$—OCO—(CH$_2$)$_{mi}$—CO]; y$_j$[O—(CH$_2$)$_{kj}$—CO] where: i, j=1–5; n$_i$=2–22; m$_i$=0–20; k$_j$=1–21;

$$\sum_{i=1}^{5} x_i + \sum_{j=1}^{5} y_j = 1$$

and x$_i$ and y$_j$ vary between 0 and 1 and are molar fractions of the various units such that $$\sum_{i=1}^{5} x_i \cdot \left(\frac{n_i + m_i}{2}\right) + \sum_{j=1}^{5} y_j \cdot k_j \geq 6,$$

or b) recurring units Z=[O—(CH$_2$)a-OCO—(CH$_2$)b-CO] where a=2–3, b=7–11, and has an intrinsic viscosity (in chloroform at 25° C.) greater than 0.7 and up to 2.5 dl/g, a melting point from 60° to 110° C., and a biodegradability such that, under composting conditions, a 30 $\mu$m film of said resin shows a decomposition of less than 10% in 14 days and more than 90% in six months.

2. The method of claim 1, in which the polyester resin is produced by polycondensation of bicarboxylic aliphatic acids with from 2 to 22 carbon atoms and of diols with from 2 to 22 carbon atoms, selected in a manner such that the half-sum of the number of carbon atoms relating to the acid and to the diol is greater than 6, or by polycondensation of hydroxyl-acids, or by ring-opening of corresponding lactones or lactides having 7 to 22 carbon atoms.

3. The method of claim 2, in which the diacids and the dialcohols are obtained from renewable resources.

4. The method of claim 1, in which the polyester resin is selected from polyethylene sebacate, polybutandiol sebacate, polyhexandiol azelate, polyhexandiol sebacate, polynonandiol azelate, polynonandiol sebacate, polyoctandiol azelate, polyocatandiol brassilate, polydecandiol sebacate, and polydecandiol brassilate.

5. The method of claim 1, in which the polyester resin is subjected to an upgrading process.

6. The method of claim 1, in which the polyester resin is a component of a blend of unmodified or modified polysacchanides.

7. The method of claim 1, in which the polyester resin contains mineral or vegetable fillers and/or additives selected from lubricants, plasticizers, colourings, flavourings, perfumes, flame-proofing agents, stabilizers with regard to hydrolysis and to thermal degradation, and antioxidants.

8. The method of claim 1, in which the mean numeral molecular weight of the polyester resin is between 45000 and 70000.

9. The method of claim 1, wherein said articles are selected from:
- coatings which are produced by extrusion-coating, with water-vapour barrier properties, and which are usable for the packaging of fresh milk and dairy products, of meat, and of foods having high water content,
- multilayer laminates with layers of paper, plastics material and or paper/plastics material, aluminum and metalized films,
- films as such and multi-layer films with other polymer materials,
- sacks for organic refuse and for grass cuttings with periods of use longer than 1 week,
- single-layer and multi-layer food packaging comprising containers for milk, toghurt, cheeses, meat and beverages, in which the layer in contact with the food or beverage is formed by the aliphatic polyester,
- composites with gelatinized or destructured starch, and/or complexed starch or natural starch as a filler,
- mono-directional and bi-directional films,
- semi-expanded and expanded products produced by physical and/or chemical means, by extrusion, injection, or agglomeration or pre-expanded particles,
- expanded sheet and expanded containers for foods, for drugs, and for fast food,
- fibres, fabrics and non-woven fabrics in the hygiene, sanitary, and clothing fields,
- composites with mineral and vegetable fillers
- thermoformed sheets for the food or fast-food packaging fields,
- bottles for the food cosmetics and pharmaceutical fields,
- fishing nets,
- containers for fruit and vegetables,
- extruded sections usable in the fast-food field and irrigation pipes in the agricultural field.

10. Polyester resins as defined in claim 1 in blends with other biodegradable polymers having a permeability to water vapour greater than 300 g×30 $\mu$m/m$^2$ per day at 38° C. and 90% RH.

11. Polyester resins as defined in claim 1 in blends with polylactic acid.

12. Polyester resins as defined in claim 1 in blends with other non-biodegradable polymers, the said polymers having a permeability to water vapour greater than 300 g×30 $\mu$m/m$^2$ per day at 38° C. and 90% RH.

13. An article of manufacture comprising:
a biodegradable article having a permeability to water vapor of less than 350 g×30 $\mu$m/m$^2$ per day at 38° C. and 90% RH manufactured from aliphatic polyester resin, wherein said aliphatic polyester resin further comprises
a) recurring units $X=[O-(CH_2)_n-OCO-(CH_2)_m-CO]$ and/or $Y=[O-(CH_2)_k-CO]$, where the half-sum of n+m is equal to or greater than 6 and k is a number equal to or greater than 6, or by copolymers comprising units and/or sequences having the formula $x_i[O-(CH_2)_{ni}-OCO-(CH_2)_{mi}-CO]$; $y_j[O-(CH_2)_{kj}-CO]$ where: i, j=1–5; $n_i$=2–22; $m_i$=0–20; $k_j$=1–21;

$$\sum_{i=1}^{5} x_i + \sum_{j=1}^{5} y_j = 1$$

and $x_i$ and $y_j$ vary between 0 an 1 and are molar fractions of the various units such that $$\sum_{i=1}^{5} x_i \cdot \left(\frac{n_i + m_i}{2}\right) + \sum_{j=1}^{5} y_j \cdot k_j \geq 6,$$

or b) recurring units $Z=[O-(CH_2)a-OCO-(CH_2)b-CO]$ where a=2–3, b=7–11, and has an intrinsic viscosity (in chloroform at 25° C.) greater than 0.7 and up to 2.5 dl/g, a melting point from 60° to 110° C., and a biodegradability such that, under composting conditions, a 30 $\mu$m film of said resin shows a decomposition of less than 10% in 14 days and more than 90% in six months.

* * * * *